United States Patent
Kelly et al.

(10) Patent No.: US 7,669,191 B1
(45) Date of Patent: Feb. 23, 2010

(54) COMPILE-TIME DISPATCH OF OPERATIONS ON TYPE-SAFE HETEROGENEOUS CONTAINERS

(75) Inventors: Sean A. Kelly, Boulder, CO (US); Roger B. Milne, Boulder, CO (US); Alexander R. Vogenthaler, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 946 days.

(21) Appl. No.: 11/152,631

(22) Filed: Jun. 14, 2005

(51) Int. Cl.
*G06F 9/45* (2006.01)
*G06F 9/44* (2006.01)

(52) U.S. Cl. .................. 717/140; 717/148; 717/150

(58) Field of Classification Search ......... 717/140–143, 717/148, 151, 116, 146–150
See application file for complete search history.

(56) References Cited

U.S. PATENT DOCUMENTS

| | | | | |
|---|---|---|---|---|
| 5,339,419 A * | 8/1994 | Chan et al. | ............. | 717/147 |
| 5,355,494 A * | 10/1994 | Sistare et al. | ............. | 717/154 |
| 5,557,793 A * | 9/1996 | Koerber | ............. | 707/103 R |
| 5,659,753 A * | 8/1997 | Murphy et al. | ............. | 717/147 |
| 6,021,275 A * | 2/2000 | Horwat | ............. | 717/159 |
| 6,026,485 A * | 2/2000 | O'Connor et al. | ......... | 712/226 |
| 6,029,181 A * | 2/2000 | Milakovich et al. | ....... | 715/209 |
| 6,088,511 A * | 7/2000 | Hardwick | ............. | 717/149 |
| 6,106,575 A * | 8/2000 | Hardwick | ............. | 717/119 |
| 6,286,135 B1 * | 9/2001 | Santhanam | ............. | 717/146 |
| 6,823,505 B1 * | 11/2004 | Dowling | ............. | 717/140 |
| 6,910,205 B2 * | 6/2005 | Bak et al. | ............. | 717/151 |
| 6,976,144 B1 * | 12/2005 | Trefler et al. | ............. | 711/170 |
| 7,162,716 B2 * | 1/2007 | Glanville et al. | ............. | 717/151 |
| 7,168,069 B1 * | 1/2007 | Sigmund | ............. | 717/140 |
| 7,284,241 B2 * | 10/2007 | Heishi et al. | ............. | 717/152 |
| 7,366,882 B2 * | 4/2008 | Sahraoui et al. | ............. | 712/221 |
| 7,565,647 B2 * | 7/2009 | Davidov et al. | ............. | 717/140 |

OTHER PUBLICATIONS

Gholizadeh et al,"An object oriented modeling framework for petri nets and related models", IEEE, pp. 546-549, 2009.*
Nguyen et al, "Design patterns for parsing", ACM SIGCSE, pp. 477-481, 2005.*

(Continued)

*Primary Examiner*—Anil Khatri
(74) *Attorney, Agent, or Firm*—LeRoy D. Maunu; Lois D. Cartier

(57) ABSTRACT

Implementing a type-safe heterogeneous containers in a memory arrangement of a computing system. In one embodiment, a main object of a class is specified in program source code. The class has a variant type, and the variant type provides at least two different data types, at least one of which is a linear array of objects of one of the data types. The class includes methods for putting and getting a variant object of the variant type in and from the main object. An application of a visitor method, which includes a respective operator for each of the different data types, is specified in the program source code for each method for getting a variant object from the main object. Compilation of the source code results in code that executes the one of the operators corresponding to the data type of a referenced variant object of the main object.

13 Claims, 3 Drawing Sheets

OTHER PUBLICATIONS

Igarashi et al, "Variant path types for scalable extensibility", ACM OOPSLA ,pp. 113-131, 2007.*

Kinnucan et al, "A graphical variant approach to object oriented modeing of dynamic systems", ACM SCSC, pp. 513-521, 2007.*

Cline, Marshall P. et al., "Chapter 27—Types and RTTI," *C++ FAQs*, Feb. 23, 1999, $2^{nd}$ Edition, pp. 367-385 (see in particular p. 383), published by Addison-Wesley, United Kingdom.

Dawes, Beman et al., "Welcome to Boost.org" Homepage, <http://www.boost.org>, copyright 1998, revised Feb. 9, 2009, downloaded Mar. 25, 2009, pp. 1-2.

Friedman, Eric et al., "Chapter 25. Boost.Variant," <http://www.boost.org/doc/libs/1_38_0/doc/html/variant.html>, copyright 2002, downloaded Mar. 20, 2009, pp. 1-4.

* cited by examiner

COMPILE-TIME DISPATCH OF OPERATIONS ON TYPE-SAFE HETEROGENEOUS CONTAINERS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to resolving at compile time operations on type-safe heterogeneous containers.

BACKGROUND

Methods and data structures that are parameterized by type are commonly used in implementing software solutions in object-oriented programming languages, including, for example, C++. Typesafe homogeneous containers are implemented in the Standard C++ Library (SL) using the language-provided template mechanism. A homogeneous container has constituent objects of the same data type. A heterogeneous container has objects of different types. For example, a C++ structure is a heterogeneous container. The size and composition of a structure, are determined at compile time, which limits flexibility.

A commonly used approach by which heterogeneous containers are implemented in C++ is via polymorphism and the run-time type identification (RTTI) facility of C++. Classes that derive from a common base class can be stored in a container via base class pointer and then down cast to the dynamic type upon extraction from the container.

This approach has a number of disadvantages. The polymorphism requires that types supported by the container inherit from a common base class, which may be invasive or restrict implementation flexibility. Furthermore, use of the RTTI facility may introduce substantial overhead since the resolution of data types occurs at runtime. In addition the use of RTTI may increase coding complexity, along with costs of testing and maintaining the program.

The present invention may address one or more of the above issues.

SUMMARY OF THE INVENTION

The various embodiments of the invention provide various approaches for implementing a type-safe heterogeneous containers in a memory arrangement of a computing system. In one embodiment, a main object of a class is specified in program source code. The class has a variant type, and the variant type provides at least two different data types, at least one of which is a linear array of objects of one of the data types. In another embodiment, a dictionary data type is one of the variant types. The class includes methods for putting and getting a variant object of the variant type in and from the main object. An application of a visitor method, which includes a respective operator for each of the different data types, is specified in the program source code for each method for getting a variant object from the main object. Invocations of the methods for putting objects in and getting objects from the main object are specified in the program source code. Compilation of the source code results in code that executes the one of the operators corresponding to the data type of a referenced variant object of the main object.

In another embodiment, an apparatus is provided for implementing a data object in a memory arrangement of a computing system. The apparatus includes means for specifying in program source code, a main object of a class, the class having a variant type and the variant type providing at least two different data types, wherein at least one of the data types is a linear array of objects of one of the data types, the class including a first method for putting a variant object of the variant type in the main object and a second method for getting a variant object of the variant type from the main object; means for specifying in the program source code for each method for getting a variant object from the main object, application of a visitor method, the visitor method including a respective operator for each of the different data types; means for specifying in the program source code at least one invocation of the first method for putting at least two variant objects of different variant types into the main object and invocations of the second method for getting variant objects from the main object; and means for compiling the program source code, wherein for each invocation of the second method executable code is generated that executes the one of the operators corresponding to the data type of a referenced variant object of the main object.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention provide an approach for making a typesafe heterogeneous container with type-dependent operator resolution performed at compile time rather than at runtime. Further embodiments provide conversion to and from an external data format that is suitable for persistent storage.

In one embodiment, a class, named XTable in this description, is defined for use as a typesafe container (the objects stored in the container are unambiguously typed) for objects of different data types. The application programming interface (API) provided by the XTable class provides a mechanism for compile time dispatched typesafe access to stored objects. The XTable class is also serializable, which supports conversion of the object data in the container to and from an external data format suitable for persistent storage. In a program that uses the XTable container, the code that gets called when invoking the XTable API is identified at compile time, which eliminates the need for runtime resolution of data types used in operations with the container.

Figure 1:
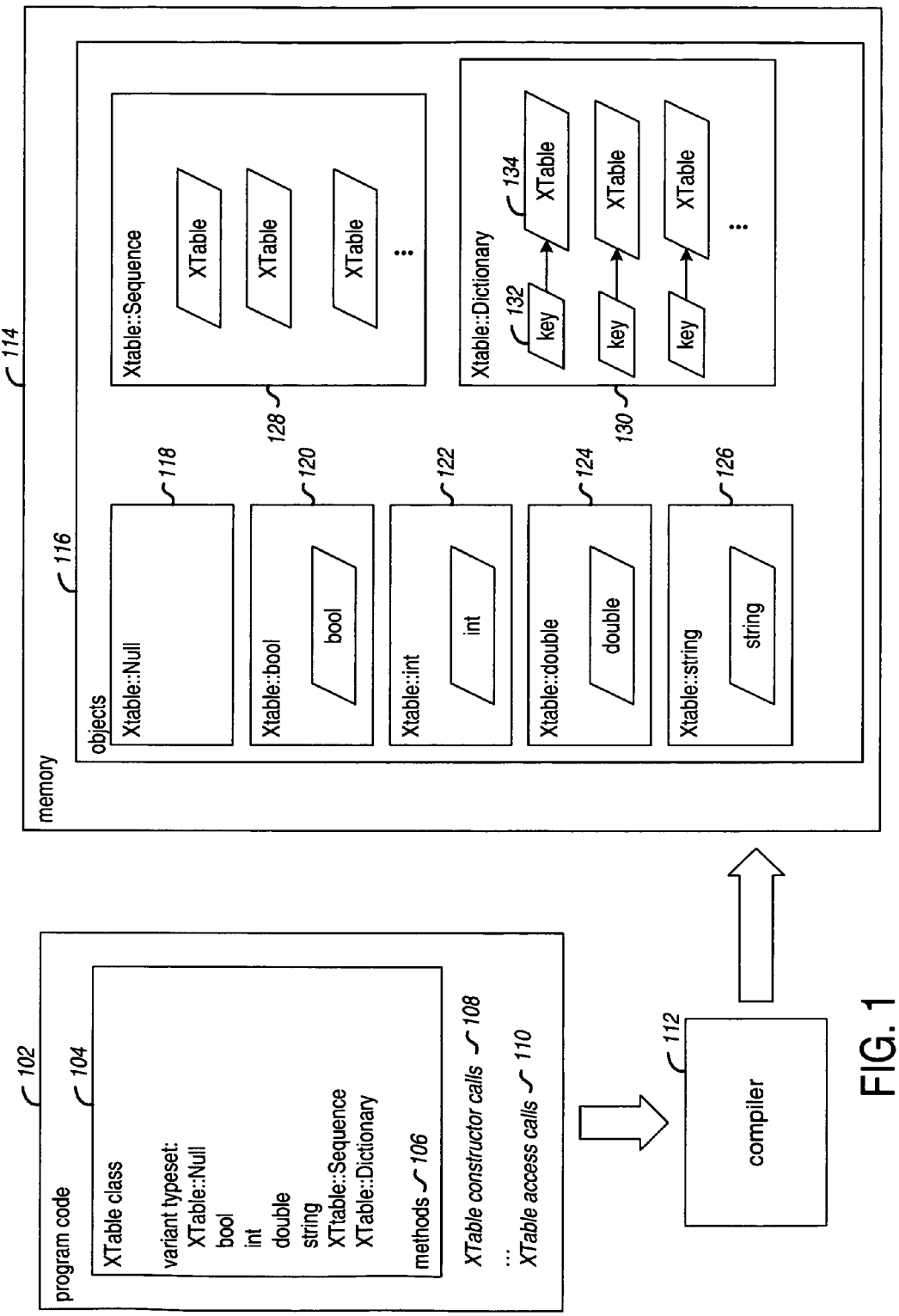
FIG. 1 is a block diagram that illustrates compilation of a program that uses a class having a heterogeneous variant typeset in accordance with various embodiments of the invention.

FIG. 1 is a block diagram that illustrates compilation of a program that uses a class having a heterogeneous variant typeset in accordance with various embodiments of the invention. Program code 102 includes XTable class 104. The XTable class includes a variant typeset with the types XTable::Null, bool, int, double, string, XTable::Sequence, and XTable::Dictionary. Various methods 106 for constructing, destructing, and accessing XTable objects are also included in the XTable class. The program code 102 is shown as including calls (108 and 110) to the XTable constructor and XTable access methods for purposes of manipulating XTables used in the program.

The compiler 112 compiles program code 102 into executable code (not shown) that is stored in a memory 114. The possible types of XTable objects that may be specified by the program code and created by the compiler and instantiated when the program is executed are shown collectively as objects 116.

Figure 2:
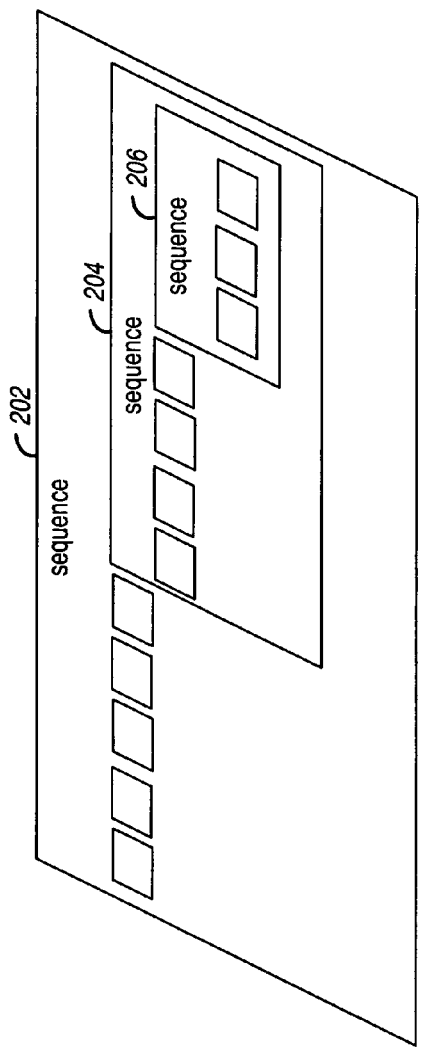
FIG. 2 illustrates an example of a recursive sequence Xtable object.
Figure 3:
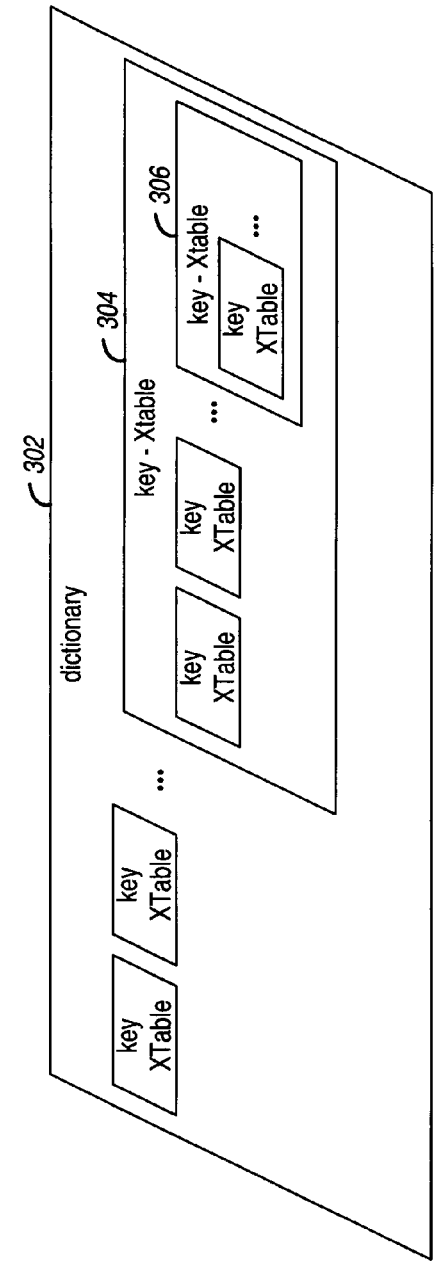
FIG. 3 illustrates an example of a recursive dictionary Xtable object.

An XTable object may have a single element of type bool, int, double, or string. Alternatively, an XTable object may have a sequence or a dictionary. A sequence is an ordered set of objects of the same variant type, and a dictionary is a set of key-value pairs with each value being indexed by the key and being of the same variant type. Sequence objects and dictionary objects may be recursively nested as illustrated in FIGS. 2 and 3. The possible types of XTable objects are shown as blocks in memory 114.

Block 118 illustrates a Null XTable object. A Null XTable object has no data and may be used in a sequence XTable object to indicate the end of the sequence, for example. Block 120 illustrates a bool XTable object which contains a Boolean value. Block 122 is an int XTable object for storing an integer value, and block 124 is a double XTable object for storing a double precision floating point value. The string Xtable object is shown as block 126 and stores a character string.

Block 128 shows a sequence XTable object. A sequence XTable object includes multiple XTable objects which may be of different variant types. A dictionary Xtable object is shown by block 130. A dictionary XTable object may have multiple XTable objects (possibly of different variant types) that are indexed by respective keys. Key 132 and XTable 134 show an example key-XTable pair in a dictionary. Sequence XTable objects and dictionary XTable objects may be recursively defined or "nested."

FIG. 2 illustrates an example of a recursive sequence XTable object 202. One object in sequence 202 is another sequence 204, and one of the objects in sequence 204 is sequence 206.

FIG. 3 illustrates an example of a recursive dictionary XTable object 302. Each object in the dictionary is a key-XTable pair and is indexed by the key. Dictionary 302 includes multiple key-XTable pairs, including the key-XTable pair that is dictionary 304. Dictionary 304 is indexed by the key associated with the dictionary. Dictionary 304 also includes multiple key-XTable pairs, one of which is dictionary 306.

Figure 4:
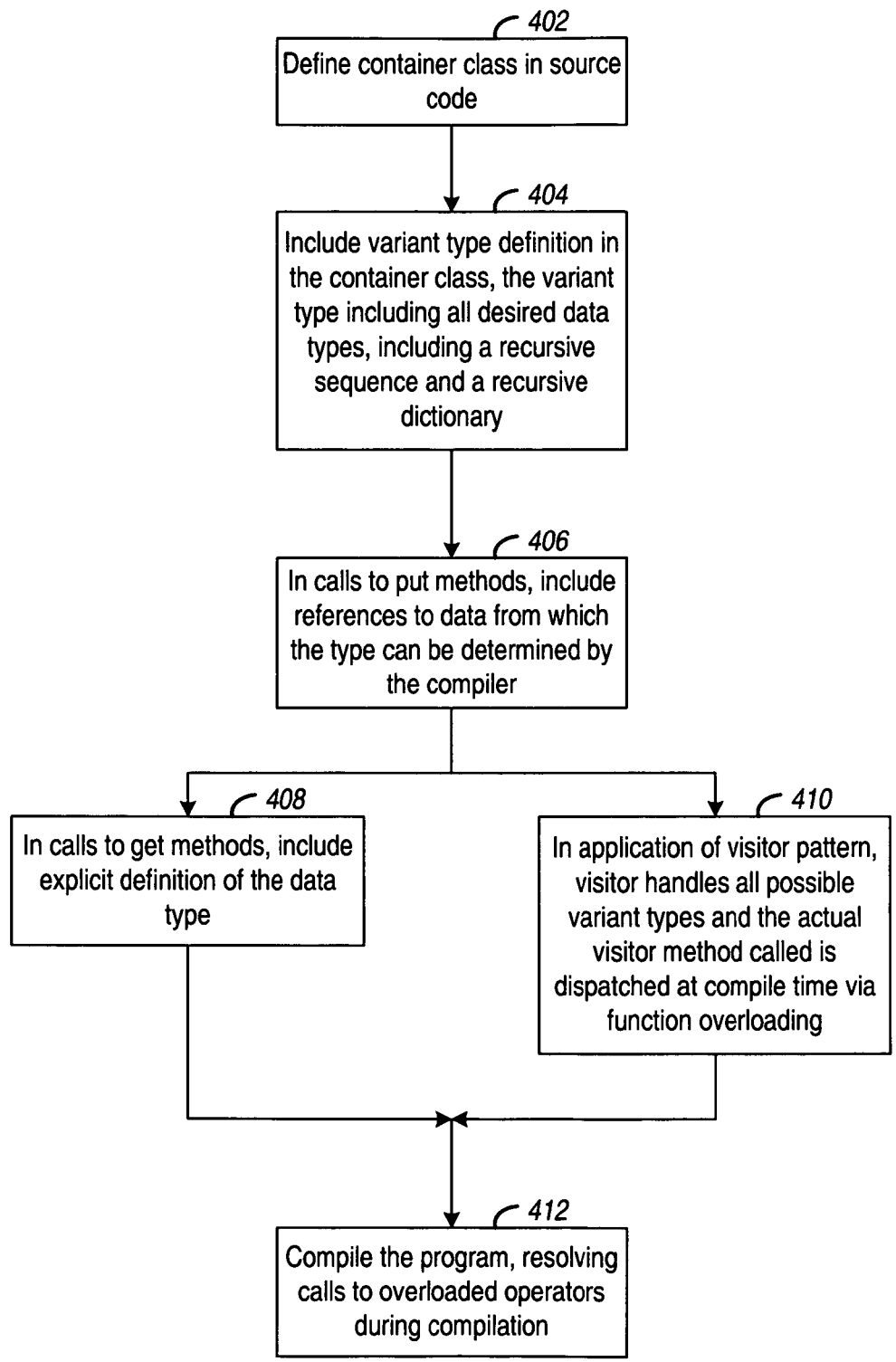
FIG. 4 is a flowchart of an example process for implementing an application having a type-safe, heterogeneous container for which compile-time dispatch of overloaded operations on the container is supported.

FIG. 4 is a flowchart of an example process for implementing an application having a type-safe, heterogeneous container for which compile-time dispatch of overloaded operations on the container is supported. The starting point for creating a type-safe, heterogeneous container is to define a suitable class in the program source code (step 402), which in the example embodiment is the XTable class. The members of the XTable class are described below in combination with the process of FIG. 4.

The example XTable class may be used to create and use type-safe sequences and dictionaries of heterogeneous objects with compile-time resolution of references to member methods based on data types of referenced objects. Following the description of the XTable class, example test code is presented in the Appendices to illustrate use of the access methods and serialization methods of an XTable object. The examples described herein are in the C++ programming language. Those skilled in the art will recognize that the invention could be implemented in alternative object-oriented programming languages.

The following description of the XTable class presents syntactically correct type definitions and accompanying comments set off by "//". The public data types include the following:

typedef Deque<XTable>Sequence;
//Sequence is a Deque of XTables. A Deque is a class defined in //XTable scope that publicly inherits from std::deque in the C++//standard library, Deque is a templatized, linear container that //supports efficient insertion at the beginning or the end of the //sequence. XTable::Deque adds a few implementation specific //methods for insertion.
typedef Map<XTable>Dictionary;
//Dictionary is a Map from string to XTable. A Map is class defined in //XTable scope that publicly inherits from std::map in the C++//standard library. Map is a templatized, ordered associative //container that maps keys onto values XTable::Map and //adds implementation specific methods for insertion.
typedef XTable::null_t Null;
//Null type
typedef boost::variant<Null, bool, int, double, std::string, boost::recursive_wrapper<Sequence>, boost::recursive_wrapper<Dictionary>>element_t;
//Template parameters enumerate list of possible variant types Included in the class definition is a variant type definition (step 404). In one embodiment, the variant type may be implemented using a variant library, which is part of the Boost component library (http://www.boost.org/index.htm). In addition to the basic data types of NULL, bool, int, double, and string, the sequence and dictionary data types are added to the variant typeset. Compile time dispatching of variant operations (such as serialization) is provided by the visitor pattern supported by the variant.

Objects that support the visitor pattern enable compile time dispatch of operations by implementing a visitable interface. A simplified version of such an interface and an example of an object that implements the interface are shown in the example code that follows.

```
class Visitable: public XKey {
public:
//Accept visitor
virtual void accept(Visitor&) const=0;
};
class Block: public Visitable {
void
    Sysgen::Block::accept(Visitor& visitor) const {
    visitor.apply(*this)
    }
}
```

The Visitor interface, as shown in the example code below, provides apply methods for a variety of concrete types that implement the visitable interface.

```
class Visitor {
public:
```

```
virtual void apply(Block* block) { }
virtual void apply(Port* port) { }
virtual void apply(Net* net) { }
}
```

The Visitor interface is implemented and the implementation is passed to the accept method of the object that implements the Visitable interface. The below example of a concrete visitor simple extracts the name of the Block object.

```
struct PrintName: public Visitor {
virtual void apply(Block* block) {
    std::cout <<block->getName( );
}
virtual void applyNet* net) {
    std::cout <<net->getNetName( );
}
};
```

One of the features of this pattern is that a heterogeneous collection of objects that implement the Visitable may be held via base class pointer and operations may be performed on the objects (such as serialization) by applying the appropriate visitor. The dispatching of the appropriate method for the concrete implementation of the Visitable interface is handled at compile time via the virtual function mechanism and function overloading features of the core language.

Returning now to the XTable class, from the public type definitions it may be observed that an element of an XTable::Sequence or the value type of an XTable::Dictionary may itself be an XTable, which shows that the underlying variant supports recursive definition. The recursive definitions may be used to construct a nested heterogeneous tree of objects. For example, a sequence may contain an object that is a dictionary, which may contain an object that is a sequence and so on.

The XTable class also includes methods for creating an XTable object and for inserting objects, reading, and removing objects from an XTable object. The public member methods of the XTable class include:

```
bool merge (XTable &source)
//Merges the contents of two XTables whose top level
    elements are //dictionaries
XTable ( )
//Default constructor
XTable (const XTable &in)
//Construct an XTable object as a copy of another XTable
    object
XTable (element_t value)
//Construct an Xtable object with an element
```

The access methods are generally referred to as put methods and get methods. The get and put methods apply to all variant types and example declarations are listed below.

```
template<typename T>T & put (const T &value)
//Insert an object of the data type of T.
template<typename T>T & put ( )
//Insert a default value of an object of the data type of T.
std::string & put (const char *value)
//Specializations for const char.
template<typename T>T * get ( )
//Returns a pointer to the concrete realization of the top
    level variant //if the type specified by the template
    parameter T matches the //actual variant type. Otherwise
    returns the null pointer.
template<typename T>const T * get ( ) const
//If successful returns requested field by pointer, and
    returns //null if unsuccessful
```

It will be appreciated that in the family of put methods the required template parameter is inferred by the compiler from the data types of the arguments provided in the calls to the put methods. Thus, to add an object to an XTable object, a put method in the program includes an object reference from which the compiler may determine the type (step 406). The containers themselves (in this case std::deque & std::map) keep track the size of sequence and dictionary XTable objects. The begin( ) and end( ) methods of the respective containers return iterators to the beginning and one beyond the end of the container contents.

Calls to the XTable get methods in the program require disambiguation of the variant types. The disambiguation may be accomplished in one of two ways (steps 408 and 410). In one use, a call to a get method may explicitly specify the type (step 406). Alternatively, the get methods may be implemented without RTTI using a generic visitor that handles all variant types (step 410). The compiler dispatches the correct overloaded function for both the use case having an explicit specification of the variant type and the use case involving the generic visitor (step 412).

The code in Example 1 below shows an implementation of an example get method. This get method may be called with an explicit specification of one of the variant types. The generic visitor, table_const_ptr_extractor( ) (shown in the code of Example 2) supports compile-time dispatch of the proper operation according to the variant data type referenced by the get operation.

```
template<typename
REQUEST_TYPE>REQUEST_TYPE* XTable::get( )
{
return    const_cast<REQUEST_TYPE*>(boost::apply-
    _visitor
    (table_const_ptr_extractor<REQUEST_TYPE>( ),_el-
    ement));
}
```

EXAMPLE 1

The get method applies the visitor object using as an input parameter a REQUEST_TYPE provided in the call to the get method. The compiler selects the correct overloaded operator( ) based upon whether the variant type of the referenced object matches the input REQUEST_TYPE. Example 2 below shows program code that implements a visitor routine for extracting a const pointer from a variant data type.

```
//Visitor for extracting const pointer from variant
//
template <typename REQUEST_TYPE>
struct table_const_ptr_extractor
:boost::static_visitor<const REQUEST_TYPE*>
{
//Variant type matches request type
const REQUEST_TYPE* operator( ) (const REQUEST-
    _TYPE& operand) const
{
    return &operand;
}
//Variant type doesn't match return null
template <typename OTHER_TYPE>
const REQUEST_TYPE* operator( ) (const OTHER-
    _TYPE& operand) const
{
    return 0;
}
};
```

EXAMPLE 2

The appropriate overloaded operators to call is determined at compile time by the compiler via the variant visitor mechanism. If the variant type in the XTable passed to operator( ) matches the REQUEST_TYPE specified by the call to the get method (as determined by the compiler), the appropriate XTable element is returned by pointer ("return &operand" in the example code) otherwise the null pointer is returned. The get method takes a type template parameter, for example, table.get<int>( ). If the XTable variant type is an int, the get method returns a pointer to the int; if the variant is not an int, then the returned pointer is null.

A generic visitor may also be used in disambiguating the variant types of an XTable object for serialize and deserialize operations. In processing an entire XTable object with support from a generic visitor, the compiler dispatches the correct overloaded function according to the variant type of each object in the XTable object. The serialize and deserialize operations may be used for purposes of saving and restoring XTable data.

The general approach to process a sequence is to get the sequence itself from the top-level XTable object and then iterate over the objects in the sequence using the std::deque or std::map interfaces to access container contents for a sequence. A similar approach may be followed to access a dictionary. The code of Example 3 below illustrates getting objects from a sequence.

```
//Get the sequence from the top level table
//Iterate over the sequence using std::deque interface methods
//Access the XTable sequence element
XTable::Sequence* seq=table.get<XTable::Sequence>( );
for(XTable::Sequence::iterator iter=seq->begin( );
iter!=seq->end( );
++iter)
{
XTable& element_of_seq=*iter;
}
```

EXAMPLE 3

The XTable class includes serialize, deserialize, and print public methods for outputting, inputting and printing data for an XTable object. For example, the data in an XTable object may be converted from the different variant data types to an ASCII character string representation for saving in retentive storage. The reverse conversion may be performed for restoring the data to an XTable object. These methods are referred to as serialization methods and include:

```
void serialize (std::ostream &os=std::cout, std::ostream::
    openmode mode=0) const
//Read and format contents of an XTable object for output;
    mode
//determines ASCII or binary.
void deserialize (std::istream &is, std::ostream::openmode
    mode=0) const
//Convert input data stream to XTable format and insert in
    an XTable
//object; mode determines ASCII or binary.
void print (std::ostream &os=std::cout) const
//Read and format contents of an XTable object in ASCII
    code in
//human readable format.
```

The XSerialize class set forth below provides the private implementation of the serialize and deserialize methods. The XSerialize class implements the visitor pattern referred to earlier.

```
class XSerialize<XTable>
class XSerialize<XTable>::binary_serialize
class XSerialize<XTable>::ascii_serialize
```

The code in Example 4 below implements an example XSerialize::encode method that applies either the ascii_serialize or the binary_serialize visitor to execute serialization. The "binary_serialize serializer(os)" is the construction of the serializer object, with its construction argument a binary stream (os). The constructed serializer instance is passed to the apply_visitor method.

```
static void encode(std::ostream& os, TABLE& table,
std::ostream::openmode mode=0)
{
if(table._mask) return;
if(mode & std::ios::binary) {
   //Binary
   binary_serialize serializer(os);
   boost::apply_visitor(serializer, table._element);
} else {
//ASCII
ascii_serialize serializer(os)
boost::apply_visitor(serializer, table._element);}
}
```

EXAMPLE 4

Following the description of the remaining members of the XTable class, further examples are provided to describe use of the generic visitor.

The XTable class also includes additional public methods that may be used in combination with the methods for inserting and removing objects from an XTable. These additional public methods of the XTable class include:

```
template<typename REQUSET_TYPE>bool is_a const
//Returns true if top-level variant is of the specified data
type.
bool empty ( ) const
//XTable non initialized.
std::string type ( ) const
//Returns a string representation of the data of a variant
type.
```

A set of public methods are included in the XTable class for inserting and removing dictionary objects from an XTable object. The dictionary_insert and dictionary_retrieve methods are provided to access multiply nested dictionaries. The dictionary access methods include:

```
template<typename T>T * dictionary_insert_value (const
    std::string &key, const T &value)
//Insert key-value into top level Dictionary.
XTable * dictionary_insert_xtable (const std::string &key)
//Insert XTable into top level Dictionary.
template<typename T>T * dictionary_insert_value (const
    std::string &path, const std::string &key, const T
    &value,
const std::string &path_delimeter="/")
//Insert key-value pair in dictionary specified by path; the
    path
//includes the keys that traverse the nested dictionaries. For
//example,
//table.dictionary_insert_value("doe/members", "john",
//"male")
//would construct an xtable of the following structure:
//(doe=>(members=>("john"=>"male"}}}
XTable * dictionary_insert_xtable (const std::string
    &path, const std::string &key, const std::string &=".")
//Insert XTable into dictionary specified by path.
template<typename T>T * dictionary_retrieve_value
    (const std::string &key)
//Retrieve value from top level dictionary.
``` template<typename T>T * dictionary_retrieve_value
   (const std::string &path, const std::string &key, const std::string
   &delimeter="/")
//Retrieve value from dictionary specified by path.
XTable * dictionary_retrieve_xtable (const std::string
   &key)
//Retrieve XTable from top level dictionary.
XTable * dictionary_retrieve_xtable (const std::string
   &path, const std::string &key, const std::string &path_delimeter="/")
//Retrieve XTable from dictionary specified by path.
const XTable * dictionary_retrieve_xtable (const std::
   string &key) const
//Retrieve XTable from top level dictionary.
const XTable * dictionary_retrieve_xtable (const std::
   string &path, const std::string &key, const std::string
   &path_delimeter="/") const
//Retrieve XTable from dictionary specified by path.

Appendix A sets forth an example test program that uses the XTable class. The xtable_accessors( ) routine tests put and get methods on sequence-type and dictionary-type XTable objects. The xtable_serialize( ) routine tests the serialization methods on the sequence-type and dictionary-type XTable objects.

Appendix B shows the text output from the test program of Appendix A.

Appendix C shows an example implementation of a binary_serialize method. Each of the overloaded operator( )'s is for one of the variant types. It will be appreciated that the operator( ) for a sequence iterates over the number of XTable objects in the sequence. Similarly, the operator( ) for a dictionary iterates over the key-value pairs in the dictionary. Both the sequence operator( ) and the dictionary operator( ) are recursive to iterate over recursive sequences and dictionaries.

Those skilled in the art will appreciate that various alternative computing arrangements, including one or more processors and a memory arrangement configured with program code, would be suitable for hosting the processes and data structures of the different embodiments of the present invention. Various tools for composing and compiling a program may be adapted in accordance with the various embodiments of the invention. In addition, the processes may be provided via a variety of computer-readable media or delivery channels such as magnetic or optical disks or tapes, electronic storage devices, or as application services over a network.

The present invention is thought to be applicable to a variety of systems for implementing type-safe heterogeneous containers. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

APPENDIX A

```
/*
* Copyright (c) 2005, Xilinx, Inc. All rights reserved.
*
* Description: Test routines for XTable.
*
*/
// Boost
//   - c.f. http://www.boost.org/libs/test
#include <boost/test/unit_test_suite.hpp>
```

APPENDIX A-continued

```
#include <boost/test/test_tools.hpp>
#include <boost/random/linear_congruential.hpp>
#include <boost/random/uniform_int.hpp>
#include <boost/random/uniform_real.hpp>
#include <boost/random/variate_generator.hpp>
#include <sstream>
// Using
using boost::unit_test::test_suite;
using std::stringstream;
static
void
xtable_accessors( )
{
   XUtility::print("Testing Scalar XTable");
   // Simple XTable - top level scaler (bool, int or double)
   XTable table0;
   // put method -- variant type is inferred
   table0.put(3.1415);
   // get method must specify type
   double* dbl_ptr = table0.get<double>( );
   std::cout << "should be double - " << *dbl_ptr << std::endl;
   // int_ptr will be null
   int* int_ptr = table0.get<int>( );
   std::cout << "should be null - " << int_ptr << std::endl;
   XUtility::print("**");
   XUtility::print("Testing Sequence XTable");
   // XTable with top level sequence
   XTable table1;
   // A Sequence is a linear array of XTables (std::deque)
   XTable::Sequence& seq = table1.put<XTable::Sequence>( );
   // XTable::Sequence inherits from std::deque which provides the
   // push_back method. An XTable object is pushed to the end of
   // a sequence.
   seq.push_back(1.002);    // double
   seq.push_back("foo");    // string
   seq.push_back(12311);    //integer
   // The std::deque also provides the get access methods and has an
   // iterator interface with support for referencing objects by array
   // indexing ("operator[ ]").
   // The print method calls the get access methods.
   table1.print( );
   XUtility::print("**");
   XUtility::print("Testing Dictionary XTable");
   // XTable with top level dictionary
      XTable table2;
   // A Dictionary is a mapping from string to XTable (std::map)
   XTable::Dictionary& dict1 = table2.put<XTable::Dictionary>( );
   dict1.insert("key1", 1.0);
   dict1.insert("key2", 1);
   dict1.insert("key3", "foo");
   // Another dictionary to embed in the top level XTable
      XTable sub_table2;
   XTable::Dictionary& dict2 = sub_table2.put<XTable::Dictionary>( );
   dict2.insert("skey1", 1.0);
   dict2.insert("skey2", 2.0);
   dict2.insert("skey3", 3.0);
   // Embed the sub table into the top table
   dict1.insert("key4", sub_table2);
   table2.print( );
   XUtility::print("**");
}
static
void xtable_serialize( )
{
   // string stream
   std::stringstream inout_stream;
   // ASCII representation of an xtable
   std::string sample("{\n"
         " 'mydouble'=>3.1415,\n"
         " 'myseq'=>[1, 2.78, 'foo', 'bar']\n"
         " 'myhash'=>{\n"
         "   'sourceFile'=>'hdl_71/synth_addsub.vhd',\n"
         "   'templateKeyValues'=>{\n"
'core_name0'=>'adder_subtracter_virtex2_7_0_77239f4f28af6e47',\n"
         "       'foo_int'=>42,\n"
         "       'foo_double'=>[72.42, 92, 'hello world']\n"
         "       'foo_bool'=>false,\n"
         "   }\n"
```

APPENDIX A-continued

```
            " },"
            " 'sub'=>'SgDeliverFile::saveCollaborationInfo'\n"
            "}\n");
    // Write the above stringofied sample XTable to a bidirectional
    stringstream inout_stream << sample;
    // ASCII deserialize the xtable
    XTable table1;
    table1.deserialize(inout_stream);
    // Binary serialize the table
    std::stringstream inout_stream2;
    table1.serialize(inout_stream2, std::ios::binary);
    // Binary deserialize the table
    XTable table2;
    table2.deserialize(inout_stream2, std::ios::binary);
    // Tables should be identical
    XUtility::print("table1");
    table1.print( );
    XUtility::print("table2");
    table2.print( );
    XUtility::print("**");
}
namespace Sysgen {
    namespace Test {
        test_suite*
        xtable_test( )
        {
            test_suite* ts = BOOST_TEST_SUITE ("XTable");
            {
                ts->add( BOOST_TEST_CASE( &xtable_accessors ) );
                ts->add( BOOST_TEST_CASE( &xtable_serialize ) );
            }
            return ts;
        }
    }; // ending namespace Test
}; // ending namespace Sysgen
```

APPENDIX B

```
--------------------------------------------------
Entering test suite "XTable"
-------------------------- Testing Scalar XTable --------------------------
should be double - 3.1415
should be null - 00000000
---------------------------------- ** ------------------------------------
-------------------------- Testing Sequence XTable --------------------------
[
    1.0020000000000000,
    'foo',
    12311
]
---------------------------------- ** ------------------------------------
-------------------------- Testing Dictionary XTable --------------------------
{
    'key1'=>1.0000000000000000,
    'key2'=>1,
    'key3'=>'foo',
    'key4'=>{
        'skey1'=>1.0000000000000000,
        'skey2'=>2.0000000000000000,
        'skey3'=>3.0000000000000000
    }
}
---------------------------------- ** ------------------------------------
-------------------------- Testing Serialization ---- ---------------------
---------------------------------- table1 --------------------------------
{
    'mydouble'=>3.1415000000000002,
    'myhash'=>{
        'sourceFile'=>'hdl_71/synth_addsub.vhd',
        'templateKeyValues'=>{
            'core_name0'=>'adder_subtracter_virtex2_7_0_77239f4f28af6e47',
            'foo_bool'=>false,
            'foo_double'=>[
                72.420000000000002,
                92,
                'hello world'
            ],
            'foo_int'=>42
        }
    },
    'myseq'=>[
        1,
        2.7799999999999998,
        'foo',
        'bar'
    ],
    'sub'=>'SgDeliverFile::saveCollaborationInfo'
}
---------------------------------- table2 --------------------------------
{
    'mydouble'=>3.1415000000000002,
    'myhash'=>{
        'sourceFile'=>'hdl_71/synth_addsub.vhd',
        'templateKeyValues'=>{
            'core_name0'=>'adder_subtracter_virtex2_7_0_77239f4f28af6e47',
            'foo_bool'=>false,
            'foo_double'=>[
                72.420000000000002,
                92,
                'hello world'
            ],
            'foo_int'=>42
        }
    },
    'myseq'=>[
        1,
        2.7799999999999998,
        'foo',
        'bar'
    ],
    'sub'=>'SgDeliverFile::saveCollaborationInfo'
}
---------------------------------- ** ------------------------------------
---------------------------------- ** ------------------------------------
```

APPENDIX C

```
/*
 * Copyright (c) 2005, Xilinx, Inc. All rights reserved.
 *
 * Description: Test routines for XTable.
 *
 */
// Serialization helper
//
class binary_serialize : public boost::static_visitor<void>
{
public:
    binary_serialize(std::ostream& os) :
        _os(os)
    {;}
    // Each of the overloaded operator( )'s is for one of the variant
    // types
    // The tags that are written by the different operators indicate the
    // data type of the bits that follow. The tags are read first during
    // deserialization and then the following bytes are interpreted
    // appropriately.
    //Serialize null
    void operator( )(const typename TABLE::Null& operand)
    {
        // Write tag
        _os.write((char*)&TABLE_NULL_TAG, TAG_LENGTH);
    }
    // Serialize bool
    void operator( )(const bool& operand)
    {
        // Write tag
        _os.write((char*)&BOOL_TAG, TAG_LENGTH);
        // Write byte
        _os.put(operand);
    }
    //serialize int
```

APPENDIX C-continued

```
void operator( )(const int& operand)
{
    // Write tag
    __os.write((char*)&INT_TAG, TAG_LENGTH);
    // Write 4 bytes for int (big endian)
    write_int(operand);
}
// Serialize double
void operator( )(const double& operand)
{
    // Write tag
    __os.write((char*)&DOUBLE_TAG, TAG_LENGTH);
    union DoubleBytes { double d; char c[8]; };
    DoubleBytes double_bytes;
    double_bytes.d = operand;
    // Write bytes in big-endian ordering.
    for (int i = 7; i >= 0 ; --i)
    {
        __os.write( reinterpret_cast<char
            *>(&double_bytes.c[i]) , 1);
    }
}
// Serialize string
void operator( )(const std::string& operand)
{
    // Write tag
    __os.write((char*)&STRING_TAG, TAG_LENGTH);
    // Write size
    write_int(operand.size( ));
    // Write chars
    for(size_t i=0; i<operand.size( ); ++i) {
        __os.put(operand[i]);
    }
}
// Serialize Sequence
void operator( )(const typename TABLE::Sequence& operand)
{
    // Write tag
    __os.write((char*) &TABLE_SEQUENCE_TAG,
    TAG_LENGTH);
    // Write size
    write_int(operand.size( ));
    // Write elements
    // The "operand[i]._mask allows a user to selectively mask of
    // portions of the XTable object such that when serialization
    // occurs that portion of the table is not written.
    for(size_t i=0; i<operand.size( ); ++i){
        if(operand[i]._mask) continue;
        binary_serialize serializer(_os);
        boost::apply_visitor(serializer, operand[i]._element);
    }
}
// Serialize Dictionary
void operator( )(const typename TABLE::Dictionary& operand) {
    // Write tag
    __os.write((char*) &TABLE_HASH_TAG, TAG_LENGTH);
    // Write size
    write_int(operand.size( ));
    // Write elements
    TABLE::Dictionary::const_iterator iter = operand.begin( );
    for(; iter!=operand.end( ); ++iter){
        if(iter->second._mask) continue;
        std::string foo = iter->first;
        // Write the key
        operator( )(iter->first);
        // Write the value
        binary_serialize serializer(_os);
        boost::apply_visitor(serializer, iter->second._element);
    }
}
private:
    void write_int(size_t a){
        //write 4 bytes in big-endian ordering.
        char b1 = (a >> 24) & 0xff ;
        char b2 = (a >> 16) & 0xff ;
        char b3 = (a >> 8) & 0xff ;
        char b4 = (a      ) & 0xff ;
        //write most significant byte
        __os.write( reinterpret_cast<char*>(&b1), 1);
        __os.write( reinterpret_cast<char*>(&b2), 1);
        __os.write( reinterpret_cast<char*>(&b3), 1);
        //write least significant byte
        __os.write( reinterpret_cast<char*>(&b4), 1);
    }
    std::ostream& __os;
};//binary_serialize
```

What is claimed is:

1. A method for implementing an object in a memory arrangement of a computing system, comprising:

inputting program source code to a processor executing a compiler;

wherein the program source code includes a main object of a class, the class having a variant type and the variant type providing at least two different data types, wherein at least one of the data types is a linear array of objects of one of the data types, the class including a first method for putting a variant object of the variant type in the main object and a second method for getting a variant object of the variant type from the main object;

wherein for each method for getting a variant object from the main object, the program source code includes application of a visitor method, the visitor method including a respective operator for each of the different data types;

wherein the program source code includes at least one invocation of the first method for putting at least two variant objects of different variant types into the main object and invocations of the second method for getting variant objects from the main object;

wherein one of the variant objects put into the main object is a linear array of variant types;

wherein the at least one invocation of the first method further includes a plurality of invocations of the first method that put variant objects of one or more of the variant types into the linear array and at least one invocation of the first method that puts a linear array variant object into the linear array;

compiling the program source code, wherein for each invocation of the second method executable code is generated that executes the one of the operators corresponding to the data type of a referenced variant object of the main object; and storing the executable code, including the variant object, in the memory arrangement.

2. The method of claim 1, wherein the class includes a third method for converting input data to a format for putting into variant objects of the main object and for invoking the first method for putting variant objects into the main object in response to converted input data, and the program source code further includes an invocation of the third method.

3. The method of claim 2, wherein the class includes a fourth method for converting variant objects of the main objects to a format for output and for invoking the second method for getting variant objects from the main object in response to invocation of the fourth method, and the program source code further includes an invocation of the fourth method.

4. The method of claim 3, wherein the format for input and the format for output include binary and ASCII code formats.

5. The method of claim 3, wherein each variant object in the linear array includes an associated mask code, and the fourth method bypasses output of the variant object in response to the value of the mask code.

6. The method of claim 1, wherein at least one of the variant types is a dictionary type, and a variant object of the dictionary type includes at least one pair of data elements including a key and a variant object of the variant type, the program source code further including at least one invocation of the first method that puts a dictionary type variant object into the main object and a plurality of invocations of the first method that put pairs of keys and variant objects into the dictionary type variant object.

7. The method of claim 6, wherein the variant object of at least one of the pairs that include a key and a variant object is a dictionary type variant object.

8. The method of claim 6, wherein the class includes a third method for converting input data to a format for putting into variant objects of the main object and for invoking the first method for putting variant objects into the main object in response to converted input data, and the program source code further including an invocation of the third method.

9. The method of claim 8, wherein the class includes a fourth method for converting variant objects of the main objects to a format for output and for invoking the second method for getting variant objects from the main object in response to invocation of the fourth method, and the program source code further including an invocation of the fourth method.

10. The method of claim 9, wherein the format for input and the format for output include binary and ASCII code formats.

11. The method of claim 1, wherein the variant types include Boolean, integer, double precision, and string.

12. A system for implementing an object, comprising:
a processor;
a memory arrangement coupled to the processor and configured with instructions for causing the processor to perform the operations including:
inputting program source code;
wherein the program source code includes a main object of a class, the class having a variant type and the variant type providing at least two different data types, wherein at least one of the data types is a linear array of objects of one of the data types, the class including a first method for putting a variant object of the variant type in the main object and a second method for getting a variant object of the variant type from the main object;
wherein for each method for getting a variant object from the main object, the program source code includes application of a visitor method, the visitor method including a respective operator for each of the different data types;
wherein the program source code includes at least one invocation of the first method for putting at least two variant objects of different variant types into the main object and invocations of the second method for getting variant objects from the main object;
wherein one of the variant objects put into the main object is a linear array of variant types;
wherein the at least one invocation of the first method further includes a plurality of invocations of the first method that put variant objects of one or more of the variant types into the linear array and at least one invocation of the first method that puts a linear array variant object into the linear array;
compiling the program source code, wherein for each invocation of the second method executable code is generated that executes the one of the operators corresponding to the data type of a referenced variant object of the main object; and
storing the executable code, including the variant object, in the memory arrangement.

13. An article of manufacture, comprising:
a processor readable storage medium configured with instructions that when executed by a process cause the processor to perform the operations including:
inputting program source code;
wherein the program source code includes a main object of a class, the class having a variant type and the variant type providing at least two different data types, wherein at least one of the data types is a linear array of objects of one of the data types, the class including a first method for putting a variant object of the variant type in the main object and a second method for getting a variant object of the variant type from the main object;
wherein for each method for getting a variant object from the main object, the program source code includes application of a visitor method, the visitor method including a respective operator for each of the different data types;
wherein the program source code includes at least one invocation of the first method for putting at least two variant objects of different variant types into the main object and invocations of the second method for getting variant objects from the main object;
wherein one of the variant objects put into the main object is a linear array of variant types;
wherein the at least one invocation of the first method further includes a plurality of invocations of the first method that put variant objects of one or more of the variant types into the linear array and at least one invocation of the first method that puts a linear array variant object into the linear array;
compiling the program source code, wherein for each invocation of the second method executable code is generated that executes the one of the operators corresponding to the data type of a referenced variant object of the main object; and
storing the executable code, including the variant object, in a memory arrangement.

* * * * *

UNITED STATES PATENT AND TRADEMARK OFFICE
CERTIFICATE OF CORRECTION

PATENT NO.       : 7,669,191 B1                                          Page 1 of 1
APPLICATION NO.  : 11/152631
DATED            : February 23, 2010
INVENTOR(S)      : Kelly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this

Seventh Day of December, 2010

David J. Kappos
*Director of the United States Patent and Trademark Office*